Feb. 5, 1952
D. N. KIRKPATRICK
2,584,714
DIFFERENTIAL MEASURING GAUGE
Filed June 21, 1949
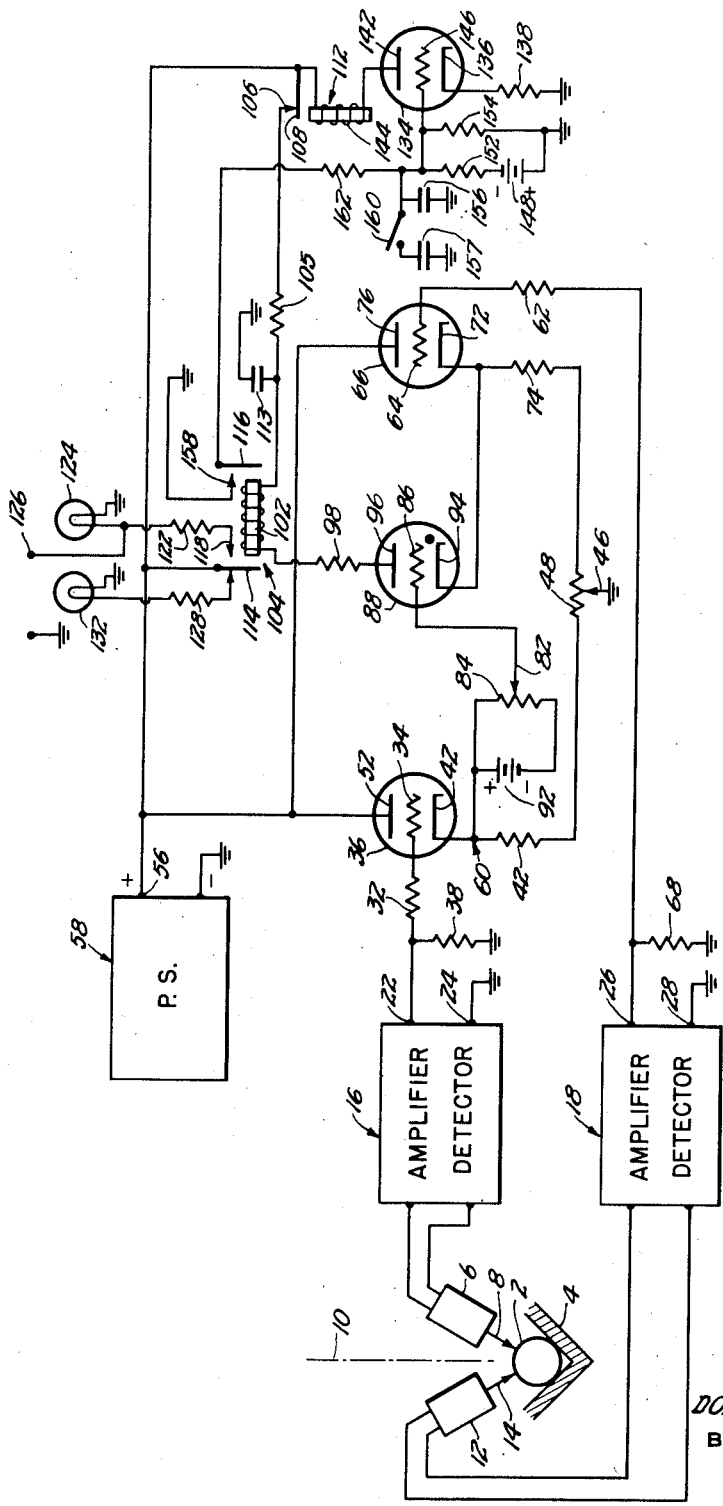
INVENTOR
*DONALD N. KIRKPATRICK*
BY
*Blair & Black*
ATTORNEYS Patented Feb. 5, 1952

2,584,714

UNITED STATES PATENT OFFICE 2,584,714

DIFFERENTIAL MEASURING GAUGE

Donald N. Kirkpatrick, Livingston, N. J., assignor to Federal Products Corporation, Providence, R. I.

Application June 21, 1949, Serial No. 100,391

8 Claims. (Cl. 177—311)

1

The present invention relates to improved and simplified differential measuring apparatus and more particularly to apparatus for indicating automatically whenever a workpiece is "out-of-round" by more than a predetermined maximum.

This invention provides a highly-stable, easily-operated system for indicating automatically when the "out-of-round" of a workpiece exceeds a predetermined adjustable maximum, and in which such indications are substantially independent of the mean diameter of the workpiece. The apparatus has the advantage that it is relatively low in cost and reliable in operation so that a minimum amount of service attention is required, and the measuring accuracy is not affected substantially by changes in supply voltage such as ordinarily occur in commercial installations. The invention accordingly consists in the various features of construction and combinations of mechanical apparatus and electronic circuits as will be exemplified in the structure to be hereinafter described.

Other objects and advantages of the invention will be in part apparent from, and in part pointed out in, the following description considered in conjunction with the accompanying drawing which shows, diagrammatically, the construction of an out-of-round measuring system embodying the invention.

In the manufacture of parts having cylindrical or conical portions it is often of no great importance to know the exact amount of out-of-round of each machined part, but is of the utmost importance to know which of the parts exceeds a given tolerance limit, and that the measurement be substantially independent of the mean diameter of the workpiece. For example, in high speed production, parts that are fabricated on centerless grinders usually develop a three-lobed configuration. If the maximum amount of "out-of-round," based on the three-lobed configuration, is determined in accordance with the particular requirements of the application for which the parts are intended, the apparatus shown in the figure can be adjusted to indicate or reject all pieces which have an "out-of-round" measurement exceeding that amount. In accordance with this invention, such measurements can be made rapidly, accurately, and automatically so that the cost per measured unit is extremely low.

As shown in the figure, a workpiece 2 rests in a 90 degree V-bed 4 and is arranged to be rotated on the V-bed and to be moved longitudinally therealong by suitable driving wheels (not shown). A first gauge head 6, having a movable feeler 8, engages the surface of the workpiece 2 and, in this example, is inclined at an angle of 30 degrees from the vertical center-line 10, the feeler 8 being directed substantially toward the center of workpiece 2. A second gauge head 12, having a feeler 14 also engaging the surface of the workpiece 2, is inclined at an angle of 30 degrees in the opposite direction from the vertical center-line 10. The gauge heads 6 and 12 are connected, respectively, to amplifier and detector arrangements shown in block form at 16 and 18.

The gauge heads 6 and 12 and the amplifier and detector arrangements 16 and 18, may, for example, be of the general type described in patent application Serial No. 541,201, filed June 20, 1944, by Harold A. Snow, now U. S. Patent 2,503,-851, and the positioning of the gauge heads 6 and 12 with respect to the workpiece and the V-bed may be substantially as shown, or in accordance with technique not herein important to the subject matter of the present claims.

As described in said patent, a direct voltage is developed between output terminals 22 and 24 of amplifier-detector arrangement 16 which is a function of the displacement of the feeler 8, from a neutral position, with respect to the gauge head 6. In a similar manner, a direct voltage is developed between output terminals 26 and 28 of amplifier-detector arrangement 18 which is a function of the displacement of the feeler 14, from its neutral position, with respect to gauge head 12.

The direct voltage appearing at terminal 22 is connected through an isolating resistance 32 to a control grid 34 of a triode vacuum tube 36, a grid return circuit being provided through a resistance 38. Cathode 42 of this tube is returned to ground through a fixed resistance 42 and an adjustable tap 46 of a potentiometer 48. Anode 52 of this tube is connected to positive terminal 56 of a conventional power supply, shown in block form at 58.

The voltage appearing at terminal 22 of the amplifier detector 16, of positive polarity in this example, controls the magnitude of the current flowing through tube 36. Therefore, the voltage developed between cathode 42 and ground is a function of the magnitude of this positive control voltage.

Terminal 26 of amplifier detector 18 is connected through an isolating resistor 62 to a control grid 64 of a triode vacuum tube 66 (preferably identical with tube 36), a ground return circuit being provided through a resistance 68. Cathode 72 of tube 66 is connected to ground through a resistance 74 and the adjustable tap 46 of potentiometer 48. Anode 76 of this tube is connected to the positive power supply terminal 56. The plate current that flows through tube 66, and accordingly the voltage at cathode 72. is a function of the magnitude of the positive voltage appearing at terminal 26 of amplifier detector 18.

The voltage appearing at cathode 42 is connected through an adjustable tap 82 of potentiometer 84 to a control grid 86 of a gaseous discharge tube 88. A negative bias voltage, the magnitude of which can be varied by adjustment of the tap 82 of potentiometer 84, is provided by a battery 92 connected in parallel with the potentiometer 84. The voltage appearing at cathode 42 is positive with respect to ground so that the grid bias voltage provided by battery 92 is opposed in polarity to the signal voltage provided from the cathode 42.

Cathode 94 of gaseous discharge tube 88 is connected to cathode 72 of tube 66. Anode 96 of gaseous discharge tube 88 is coupled through a current-limiting resistor 98, relay actuating coil 102 of a relay 104, a series resistor 105, and contact 106 and armature 108 of a relay 112 to positive terminal 56 of power supply 58. A condenser 113 is connected from the junction of resistor 105 and coil 102 to ground, and forms, in conjunction with a resistor 105, filter or time-delay network which prevents ignition of the tube 88 by transient or shock signals when the anode voltage is re-applied suddenly.

The voltage appearing at grid 86 with respect to ground is a function of the voltage delivered by amplifier-detector 16, whereas the voltage appearing at cathode 94 of tube 88 is a function of the magnitude of voltage delivered by amplifier-detector 18. So long as the voltage on grid 86 of tube 88 is negative by a predetermined amount with respect to cathode 94, tube 88 will not ignite, but if the relative positive voltage on grid 86 exceeds this predetermined amount, the tube 88 will ignite and carry substantially full current until de-energized by some external means. As the magnitude of the voltage from amplifier-detector 16 increases, the anode current through tube 36 increases, thus increasing the voltage of grid 86 of tube 88 in a positive direction, which would tend to cause the tube 88 to ignite and to carry current. As the magnitude of the voltage delivered by amplifier-detector 18 increases, the anode current of tube 66 is increased, which increases the potential of cathode 94 in a positive direction, thus, tending to prevent the ignition of tube 88.

In operation, the potentiometer 48 is adjusted so that tubes 36 and 66 carry equal plate currents with equal voltages applied to their control grids.

If a right or true cylindrical workpiece is rotated on the V-bed 4, the voltage delivered by amplifier-detector 16 will be the same as the voltage delivered by amplifier 18, and, accordingly, the plate currents of tubes 36 and 66 will be equal, and the voltages applied to the grid 86 and cathode 94 of tube 88 will effectively offset one another, so that only the residual negative bias applied by battery 92 will be effective and, if this voltage is adjusted so that it is more negative than the critical value, tube 88 will not ignite. In practice, tap 82 of potentiometer 84 is adjusted so that the tube will not ignite unless a greater positive voltage is applied to the grid than is applied to the cathode, and furthermore so that this difference in voltage required to ignite the tube 88 represents the difference in voltage produced as a result of a difference in out-of-round corresponding to the desired tolerance limit. For example, assume that a workpiece having an out-of-round exceeding the maximum desired tolerance limit is rotated on the V-bed 4, the difference in the voltages delivered by amplifier-detectors 16 and 18 will vary as the workpiece is rotated. At one point during the rotation, terminal 22 will be more positive than terminal 26 by the maximum amount. At this point, the positive voltage applied to grid 86 of tube 88 will not be entirely offset by the positive voltage applied to cathode 94, by virtue of the voltage existing at terminal 26 and, because the workpiece 2 exceeds the desired dimensional limit, the gaseous tube 88 will ignite and carry substantially full plate current.

When tube 88 ignites, actuating coil 102 of relay 104 is energized and armatures 114 and 116 will be drawn inwardly toward the core of coil 102. This movement causes armature 114 to engage relay contact 118, which closes a circuit from power supply terminal 56 through armature 114, contact 118, resistance 122, and a reject indicator lamp 124 to ground. This circuit ignites the indicator lamp 124 denoting that the workpiece under test should be rejected. A terminal 126 is also provided which is energized simultaneously with lamp 124 and which may be utilized to operate auxiliary relays and other apparatus to automatically reject the workpiece. If the tube 88 fails to be ignited by the workpiece under test, relay coil 102 remains de-energized and the circuit is completed from power supply terminal 56 through armature 114, dropping resistance 128, and lamp 132 to ground, indicating that the workpiece under test is within the prescribed tolerance limit.

The ignition of tube 88 also initiates the action of a time-delay circuit for extinguishing the tube 88 so that another workpiece can be tested. In order to accomplish this, a vacuum tube 134 is provided, the cathode 136 of which is connected to ground, and the anode 142 of which is connected to power supply terminal 56 through an actuating coil 144 of relay 112. Control grid 146 of this tube is ordinarily biased negatively by means of a battery 148 which is connected to grid 146 through a resistance 152, the positive terminal of the battery being connected to ground. The grid 146 is also returned to ground through a parallel resistance 154. This negative bias supplied to grid 146 preferably is sufficient to substantially limit the flow of plate current in tube 134 so that relay coil 144 is not sufficiently energized to attract armature 108.

The negative bias applied to the grid 146 charges a condenser 156 and a condenser 157 which is connected in parallel with condenser 156 through a normally-closed switch 160, the condensers being connected between grid 146 and ground. However, when tube 88 is ignited, and actuating coil 102 of relay 104 is energized, a circuit is closed from ground through relay contact 158, armature 116, and resistance 162 to the grid 146. The change in bias voltage of tube 134 caused by completion of this circuit will cause an increase in the plate current of tube 134, but this effect cannot take place instantaneously because of the time required to discharge the condensers 156 and 157. Accordingly, the bias-voltage on grid 146 will gradually become less negative, at a rate dependent upon the values of the resistors and condenser in the grid circuit. These circuit values are selected to provide a time constant, or period of delay, depending upon the rate at which it is desired to test the individual pieces. As the grid 146 becomes increasingly positive, the anode current through tube 134 increases until relay actuating coil 144 is sufficiently energized that armature 108 is attracted to it, thus opening the connection between armature 108 and contact 106, which opens the anode circuit of the tube 88, thus extinguishing tube 88 and deenergizing relay 102. The circuit between contact 158 and armature 116 also is opened and the voltage on grid 146 gradually returns to its original negative value at a rate depending upon the values of the circuit components.

The entire circuit is now in its original condition with lamp 132 illuminated and will remain so until another workpiece exceeds the predetermined dimensional limits.

In order to facilitate the "setting-up" of the instrument, the switch 160 is opened so that the cycling rate is controlled only by condenser 156, which is much smaller than condenser 157 and thus causes rapid cycling so that the indicator lamps will follow rapid changes in the positions of the feelers 8 and 14 or adjustment of contact 82 of potentiometer 84.

It is apparent that the apparatus described herein is well suited to obtain the ends and objects hereinbefore set forth, and that certain operating advantages, particularly valuable in the practical installations, are inherent in the arrangement and construction of the system. For example, the line voltage of commercial distributions systems in many machine shops fluctuates because of the rapidly varying load conditions. This would ordinarily cause difficulty in operation of automatic precision measuring equipment. However, in this system an increase in voltage delivered by power supply 58 causes an increase in the plate currents of both tubes 36 and 66, but the change in their voltages, which are applied to the gaseous discharge tube 88, oppose each other so that the change in operating voltage effectively is cancelled. The firing-point of gaseous discharge tube 88 will not be affected adversely by normal line voltage changes because of the inherent characteristics of such tubes.

I claim:

1. A differential measuring system for indicating automatically workpieces having an out-of-round exceeding a predetermined limit comprising first and second gauge heads having movable feelers adapted to engage at spaced positions the surface of a rotating workpiece, first and second amplifier-detectors coupled, respectively, to said first and second gauge heads for producing first and second direct voltages which are functions, respectively, of the displacements of the feelers of said first and second gauge heads with respect to their neutral positions, first and second electron amplifier tubes coupled, respectively, to said first and second direct voltages and having their anode currents controlled thereby, a relay control tube coupled to said first and second tubes and having a first control electrode coupled to said first tube and a second control electrode coupled to said second tube so arranged that an increase in anode current of said first tube tends to increase the current through said relay control tube and an increase in anode current of said second tube tends to decrease the current through said relay control tube operatively to respond only to a differential in voltage supplied from said first and second amplifier-detectors, a relay controlled by the current through said control tube, and an indicator circuit energized by said relay in response to measurement of a workpiece having an out-of-round greater than said predetermined limit.

2. A differential measuring system for indicating automatically workpieces having an out-of-round exceeding a predetermined limit comprising first and second gauge heads having movable feelers adapted to engage at spaced positions the surface of a rotating workpiece, first and second amplifier-detectors coupled, respectively, to said first and second gauge heads for producing first and second direct voltages which are functions, respectively, of the displacements of the feelers of said first and second gauge heads with respect to their neutral positions, first and second vacuum tubes each having an anode, a cathode, and a control electrode, each of said control electrodes being coupled to one of said direct voltages so that the anode currents of said tubes are controlled thereby, a gaseous discharge control tube coupled to said first and second tubes and having a first control electrode coupled to said first tube and a second control electrode coupled to said second tube and arranged so that an increase in anode current of said first tube tends to ignite said control tube and an increase in anode current of said second tube tends to prevent ignition of said control tube operatively to respond only to a differential in voltage supplied from said first and second amplifier-detectors, a relay controlled by the current through said control tube, and an indicator circuit energized by said relay in response to measurement of a workpiece having an out-of-round greater than said predetermined limit.

3. A differential measuring system for indicating automatically workpieces having an out-of-round exceeding a predetermined limit comprising first and second gauge heads having movable feelers adapted to engage at spaced positions the surface of a rotating workpiece, first and second amplifier-detectors coupled, respectively, to said first and second gauge heads for producing first and second direct voltages which are proportional, respectively, to the displacements of the feelers of said first and second gauge heads with respect to their neutral positions, first and second amplifier vacuum tubes having input and output circuits, said input circuits being coupled, respectively, to said first and second direct voltages and having their anode currents controlled thereby, a gaseous discharge control tube, coupling circuits so coupling said output circuits to said control tube that the voltages from said output circuits effectively oppose each other, a relay connected in series with said control tube, an indicator energized by said relay for denoting the presence of a workpiece having an out-of-round greater than said predetermined limit, and a time delay circuit responsive to ignition of said control tube for de-energizing said tube after a predetermined time interval.

4. A differential measuring system for indicating automatically workpieces having an out-of-round exceeding a predetermined limit comprising first and second gauge heads having movable feelers adapted to engage at spaced positions the surface of a rotating workpiece, first and second amplifier-detectors coupled, respectively, to said first and second gauge heads for producing first and second direct voltages which are proportional, respectively, to the displacements of the feelers of said first and second gauge heads with respect to their neutral positions, first and second amplifier vacuum tubes having input and output circuits, said input circuits being coupled, respectively, to said first and second direct voltages and having their anode current controlled thereby, a gaseous discharge control tube, coupling circuits so coupling said output circuits to said control tube that the voltages from said output circuits effectively oppose each other, a relay connected in series with said control tube, an indicator energized by said relay for denoting the presence of a workpiece having an out-of-round greater than said predetermined limit, and a time delay circuit responsive to ignition of said control tube for de-energizing said tube after a predetermined time interval, said circuit including at least two condensers and a switch arranged to connect and disconnect at least one of said condensers to said circuit thereby to control said time interval so that it can be shortened to facilitate adjustment or calibration of the system.

5. A differential measuring system for indicating automatically workpieces having an out-of-round exceeding a predetermined limit comprising first and second gauge heads having movable feelers adapted to engage at spaced positions the surface of a rotating workpiece, first and second amplifier-detectors coupled, respectively, to said first and second gauge heads for producing first and second direct voltages which are functions, respectively, of the displacements of the feelers of said first and second gauge heads with respect to their neutral positions, first and second normally-conducting vacuum tubes each having an anode, a cathode, and a control electrode, each of said control electrodes being coupled to one of said direct voltages so that the anode currents of said tubes are controlled thereby, a source of anode voltage for energizing said tubes, a normally non-conducting gaseous discharge control tube coupled to said first and second tubes and having a first control electrode coupled to said first tube and a second control electrode coupled to said second tube and so arranged that an increase in anode current of said first tube tends to ignite said control tube and an increase in anode current of said second tube tends to prevent ignition of said control tube, a source of bias voltage connected to said control tube, means for manually varying said bias voltage to regulate the ignition point of said control tube, a relay actuated by ignition of said control tube, a time delay circuit actuated by said relay for extinguishing said control tube a predetermined interval of time after ignition thereof, and a control circuit energized by ignition of said control tube to indicate the presence of a workpiece exceeding said predetermined limit.

6. A differential measuring system for indicating automatically workpieces having an out-of-round exceeding a predetermined limit comprising first and second gauge heads having movable feelers adapted to engage at spaced positions the surface of a rotating workpiece, first and second amplifier-detectors coupled, respectively, to said first and second gauge heads for producing first and second direct voltages which are proportional, respectively, to the displacements of the feelers of said first and second gauge heads with respect to their neutral positions, first and second amplifier vacuum tubes having input and output circuits, said input circuits being coupled, respectively, to said first and second direct voltages and having their anode currents controlled thereby, a gaseous discharge control tube, coupling circuits so coupling said output circuits to said control tube that the voltages from said output circuits effectively oppose each other, a first relay connected in series with said control relay tube, an indicator energized by said relay for denoting the presence of a workpiece having an out-of-round greater than said predetermined limit, a time delay circuit responsive to ignition of said control tube for de-energizing said tube after a predetermined time interval, and a second relay under the control of said time delay circuit for re-energizing said tube a predetermined interval of time after de-energization thereof.

7. A differential measuring system for indicating automatically workpieces having an out-of-round exceeding a predetermined limit comprising first and second gauge heads having movable feelers adapted to engage at spaced positions the surface of a rotating workpiece, first and second amplifier-detectors coupled, respectively, to said first and second gauge heads for producing first and second direct voltages which are proportional, respectively, to the displacements of the feelers of said first and second gauge heads with respect to their neutral positions, first and second amplifier vacuum tubes having input and output circuits, said input circuits being coupled, respectively, to said first and second direct voltages and having their anode currents controlled thereby, a gaseous discharge control tube, coupling circuits so coupling said output circuits to said control tube that the voltages from said output circuits effectively oppose each other, a first relay connected in series with said control relay tube, an indicator energized by said relay for denoting the presence of a workpiece having an out-of-round greater than said predetermined limit, a time delay circuit responsive to ignition of said control tube for de-energizing said tube after a predetermined time interval, said circuit including at least two condensers and a switch arranged to connect and disconnect at least one of said condensers to said circuit thereby to control said time interval so that it can be shortened to facilitate adjustment or calibration of the system, and a second relay under the control of said time delay circuit for re-energizing said tube a predetermined interval of time after de-energization thereof.

8. Apparatus for determining when the out-of-round of a workpiece exceeds predetermined limits comprising a workpiece, means for rotating said workpiece, first and second gauge heads having movable feelers engaging the surface of said workpiece, first and second amplifier-detectors coupled, respectively, to said first and second gauge heads and for producing direct control voltages proportional in magnitude to the displacements of said feelers from their neutral positions, first and second vacuum tubes each having a cathode, an anode, and a control electrode, said control electrodes being coupled, respectively, to said first and second control voltages, a gaseous discharge tube having a cathode, an anode, and a control electrode, a first coupling circuit connecting said cathode of said first tube to said control electrode of said gaseous discharge tube, a second coupling circuit connecting said cathode of said second tube to said cathode of said gaseous discharge tube, a source of bias voltage for said gaseous discharge tube, means for manually adjusting said bias voltage to prevent ignition of said gaseous discharge tube so long as the currents through said first and second tubes are equal, a first relay responsive to ignition of said gaseous discharge tube, an indicator lamp controlled by said relay for denoting that the dimensions of said workpiece exceed said predetermined limit, and a time delay circuit under the control of said relay for extinguishing said gaseous discharge tube a predetermined interval of time after ignition thereof.

DONALD N. KIRKPATRICK.

REFERENCES CITED

The following references are of record in the file of this patent:

UNITED STATES PATENTS

| Number | Name | Date |
| --- | --- | --- |
| 2,329,048 | Hullegard | Sept. 7, 1943 |
| 2,387,444 | Hayslett et al. | Oct. 23, 1945 |
| 2,417,292 | Coake | Mar. 11, 1947 |
| 2,483,867 | Anderson et al. | Oct. 4, 1949 |